Sept. 8, 1931. W. D. JONES 1,822,869
CHEESE CUTTER
Filed May 25, 1928
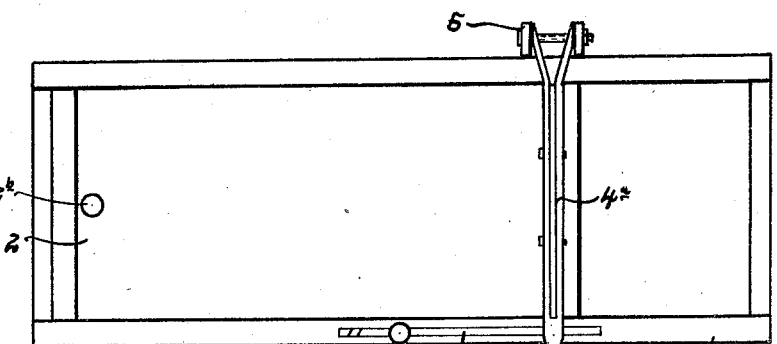
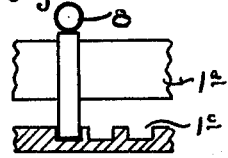
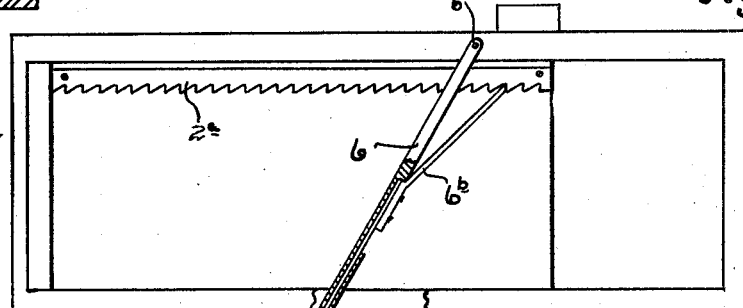
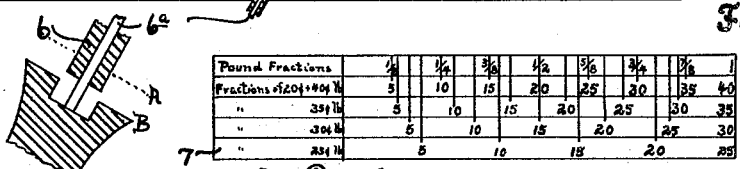
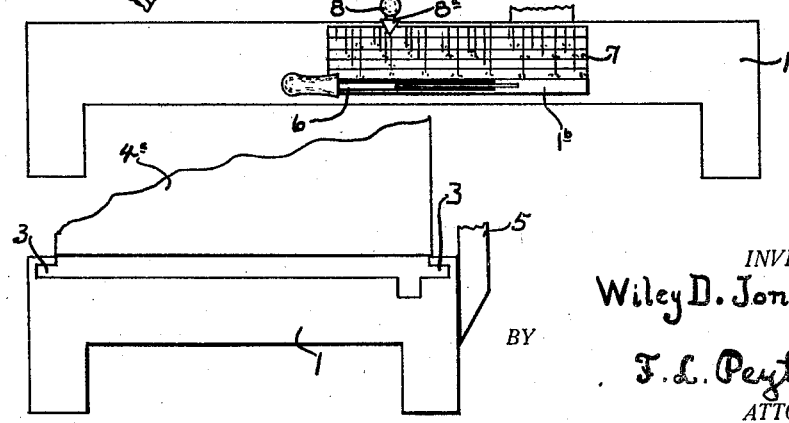
INVENTOR.
Wiley D. Jones.
BY
J. L. Peyton, Jr.
ATTORNEY.

Patented Sept. 8, 1931

1,822,869

UNITED STATES PATENT OFFICE

WILEY D. JONES, OF JACKSON, MISSISSIPPI

CHEESE CUTTER

Application filed May 25, 1928. Serial No. 280,561.

The invention here disclosed is an improvement on cheese cutters adapted for measuring and cutting slices of brick cheese.

In recent years cheese made for the retail trade has largely been molded in large five and ten pound bricks. These bricks of cheese are sold to grocers, or like merchandisers, who, on order, slice a piece of cheese from the brick according to the amount desired to be purchased.

In the sale of cheese to the retail trade, the customary way to cut the cheese has been to take a large knife, and guessing the amount to be cut, pressing the knife downward with the hands until the piece is severed from the whole. I am aware, that several inventions have been devised, of a broadly similar nature to my own, but so far as I am aware, none of these inventions have proved of practical worth and have never been adopted by the commercial trade.

It is, therefore, with the purpose in mind of furnishing a cheese cutter of this nature of practical merit, that I have devised the hereafter described invention. The device here shown and described is small, compact, of few parts, easily operated and handled, and furnishes accurate gauging of the cuts made both as to price and weight.

Various uses and advantages of my invention not here mentioned will be in part obvious from an inspection of the accompanying drawings and in part will be more fully set forth in the following particular description of one form of the device.

Figure 1 represents a top plan of the device.
Figure 2 represents a bottom plan thereof.
Figure 3 represents a front view thereof.
Figure 4 represents an end view thereof, with knife and supporting arm partly broken away.
Figure 5 represents an enlargement of the scale 7.
Figure 6 represents a cross-sectional view of the clutch handle.
Figure 7 represents a cross-sectional view of the gauge setter.

As illustrated, my invention comprises a base 1, with grooves 3—3 along the adjacent upper inner edge of each side thereof, in which fits the lead or sliding table 2. On the front portion of the base is a slot 1b in alignment with a slot 1a along the upper front side of said base. Through the slot 1b passes the clutch arm 6, provided with a hollow space extending longitudinally and centrally thereof, which is appropriately hinged to the lower side of the base 1. Slidable in the hollow space of arm 6 is handle 6a having pawl 6b rigidly attached thereto, said pawl extending into engagement with rack bar 2a, said rack bar being appropriately fastened to the under side of the table 2. Extending from the clutch arm 6 to engagement with the rack bar 2a is the pawl 6b. The rack bar 2a is appropriately fastened to the under and rear side of the table 2.

On the front of the base, appropriately aligned with the slot 1b, is the scale 7. This scale is marked off in fractions of one pound, and is further marked in monetary fractions ranging from 20¢ to 40¢ on pound fractions.

Passing through the slot 1a and past the slot 1b is the gauge setter 8 which is adapted to be fitted in one of the holes 1c on the interior side of the slot 1b.

On the rear side of the base 1 is the support arm 5 to which is hinged the knife handle 4, to which handle is affixed the blade 4a. The location of the knife 4 is fixed at a predetermined point on the base 1, with relation to the gauge scale 7.

In operation, the brick of cheese is laid on the table 2, with the end of the cheese abutting the front end of the table, that is at the table end next the knife. The knife blade is then raised, and the table is ready to be moved to the right. If a purchaser desires to purchase a quarter of a pound of cheese, the gauge setter 8 is raised by the thumb and fore-finger and is slid along the slot 1a until its pointer 8a rests at the demarcation on the scale 7, pound fractions one-fourth; the setter 8 is then pushed downward to engage with the hole 1c, on the interior side of the slot 1b, and corresponding in location to the demarcation on the scale.

The gauge setting being made, the handle of the clutch arm 6 is pushed forward until it is in juxtaposition with the arm, and by this movement the handle is pushed from position B shown in Figure 6 to the dotted line A shown therein. By this movement the pawl 6b is brought into engagement with the teeth of the rack-bar 2a; the clutch arm 6 is then pivoted on the pin 6c to the right, until stopped by the gauge setter 8. With the movement of the arm 6 to the right, the table 2 is likewise moved to the right, and the brick of cheese on the table 2 is stationed with relation to the knife so that on lowering the knife an exact quarter of a pound of cheese will be cut from the whole. Should a customer call for fifteen cents worth of cheese, and cheese is selling for 35¢ per pound, the gauge setter would be set to the scale demarcation, where pound fractions at 35¢ per pound are shown, and the setting being made, an advancement of the table 2 would be made as previously described.

Should it be desired to move the table to the left, the handle 6 is drawn away from the device, thereby releasing the pawl 6b from engagement with the rack-bar 2a, and thus permitting free movement of the table 2 in the grooves 3—3. To facilitate the handling of the table 2, a small handle 2b is provided at the left extremity of the table.

It should be mentioned that brick cheese has a range in price from 20¢ to 40¢ per pound, and to meet this variation the scale is devised; however, the fluctuations in the price of cheese being greater, alteration in the scale could be made to meet the market requirement.

It is thus seen that I have invented a device both practical and useful. It is a device which eliminates waste, and by its size may easily be handled, and, if desired, may be placed, with the brick of cheese thereon in an ice box in hot weather, when cheese is apt to melt or become soggy, thereby meeting a public demand which no other device of a similar nature has heretofore done.

It is of course understood that while I have shown and described and have pointed out in the annexed claims certain novel features of my invention, it will be understood that various omissions, substitutions and changes in the form and details of the device illustrated and its means of use may be made by those skilled in the art without departing from the spirit of the invention.

Having thus described my invention, What I claim is:

1. In a device of the character described comprising a base and a leaf adapted to slide therein, a lever pivoted at one end to the base, said lever provided with a hollow space extending longitudinally and centrally thereof and a handle member with an extension adapted to slide within the longitudinal opening, a pawl attached to the extension of the handle member, said pawl adapted to engage a rack-bar positioned on the under side of the leaf.

2. In a cheese cutter for the cutting of brick cheese, a rectangular base having parallel grooves extending along either inner side lengthwise of said base and adjacent the upper edge thereof, a leaf adapted to fit in said grooves and extending lengthwise of the leaf at the under and rear side thereof a rack bar, in juxtaposition with said rack bar a pawl attached to a lever the end of said lever being hinged to the under rear side of said base, means within said lever to advance and withdraw the pawl from engagement with the rack bar, a pin adapted to slide in a slot in the face of the base adjacent the front side thereof and adapted to fit in predetermined holes disposed in the lower front edge of another slot in the front side of the base below the first named slot and adapted to limit the movement of the lever in one predetermined direction to a variable degree, and hinged to the rear side of the base a knife, said knife adapted to rest on the table leaf.

3. In a device of the character described comprising a base and a leaf adapted to slide longitudinally therein, in combination with a scale positioned above a longitudinal slot in the front side of the base having a lever operable therein, the said lever being pivoted at the rear edge thereof to the base, the front face of said base having a longitudinal slot extending therein adjacent the scale and a pin adapted to move in the slot and engage with holes in the lower edge of the first named slot, said holes being positioned in predetermined relationship to the scale, and a pawl secured to a slidable member of the lever, said pawl adapted to engage with a rack bar on the under side of the leaf when the slidable member of the lever is advanced.

4. In a device of the character described comprising a base and a leaf adapted to slide therein, a lever pivoted at one end of the base, said lever provided with a handle member adapted to slide within a longitudinal opening in the lever and a pawl attached to an extension of the handle member, the pawl adapted to engage a rack bar positioned on the under side of the leaf, and a slot in the face of the base adjacent the front side thereof and having disposed therein a pin adapted to slidable adjustment in predetermined position along said slot.

In testimony whereof I hereunto affix my signature.

WILEY D. JONES.